US 6,751,511 B1

United States Patent
Wang

(10) Patent No.: US 6,751,511 B1
(45) Date of Patent: Jun. 15, 2004

(54) ELECTRONIC RECORDING DEVICE

(75) Inventor: Mao-Sui Wang, Taipei (TW)

(73) Assignee: Leadtek Research Inc., Taipei (TW)

( * ) Notice: Subject to any disclaimer, the term of this patent is extended or adjusted under 35 U.S.C. 154(b) by 0 days.

(21) Appl. No.: 09/556,789

(22) Filed: Apr. 25, 2000

(30) Foreign Application Priority Data

Oct. 30, 1999 (TW) ..................................... 88118873 A

(51) Int. Cl.⁷ .............................................. G06F 13/00
(52) U.S. Cl. ...................... 700/94; 710/303; 369/29.02
(58) Field of Search ........................ 710/303; 361/686; 709/217, 219; 369/29.02; 700/94

(56) References Cited

U.S. PATENT DOCUMENTS 5,841,979 A * 11/1998 Schulhof et al. ............. 709/237
6,038,199 A * 3/2000 Pawlowski et al. ......... 369/29.02
6,148,243 A * 11/2000 Ishii et al. ..................... 700/94
6,148,353 A * 11/2000 Cho ............................ 710/303
6,170,020 B1 * 1/2001 Blakeney et al. ............ 710/10
6,216,185 B1 * 4/2001 Chu ............................ 710/303

* cited by examiner

*Primary Examiner*—F. W. Isen
*Assistant Examiner*—Brian Pendleton
(74) *Attorney, Agent, or Firm*—Rabin & Berdo, P.C.

(57) ABSTRACT

An electronic recording device for storing a digital voice data encoded by a personal computer or a web server. The electronic recording device includes a docking station and an electronic tape. The digital voice data is stored in a memory in the electronic tape. A voice player reads out the stored digital voice data from a digital/analog-converting unit and a magnetic head in the electronic tape. Further, the electronic recording device is capable of radio-frequency transmitting/receiving.

21 Claims, 4 Drawing Sheets

ELECTRONIC RECORDING DEVICE

BACKGROUND OF THE INVENTION

This application incorporates by reference Taiwanese application Serial No. 88118873, filed 10/30/1999.

1. Field of the Invention

The invention relates in general to an electronic recording device, and more particularly to an electronic recording device capable of automatically capturing voice data.

2. Description of the Related Art

As the computer science develops faster and faster, users can download a variety of data from Internet or the World Wide Web (WWW). Internet becomes an important and popular way for users to get modem and necessary information and data. Now, data in Internet includes text data, voice data, image data etc. Recently, even popular songs can be found and downloaded from Internet for commercial benefits. Those songs are compressed by compression standard for reducing time and capacity taken by users. This compression standard is, for example, MP3 (MPEG Layer 3).

Personal computer (PC) is commonly used for browsing or downloading data from Internet. However, there exist disadvantages when PC is used in performing browsing operation or downloading operation. The limitation of the space and device are the most significant. That is, users must stay near PC when they use PC to browse or download data from Internet. Besides, few efficient devices can be used.

SUMMARY OF THE INVENTION

It is therefore an object of the invention to provide an improved and simplified electronic recording device. The electronic recording device includes a portable electronic tape. The digital voice data, downloaded from Internet, is stored in the portable electronic tape. A voice player with magnetic heads reads out the voice data stored in the electronic tape. The voice player can be, for example, a cassette recorder, a Walkman etc. By using the device according to the preferred embodiment of the invention, users may read data in Internet in any time and any place.

The invention achieves the above-identified objects by providing a new electronic recording device, for storing a digital voice data encoded by a personal computer (PC) or a web server. The digital voice data is downloaded from the web server by PC. The electronic recording device includes a docking station and an electronic tape. The electronic tape can be placed in the docking station and used for storing the digital voice data. The docking station includes: a port terminal, coupled to PC; and a first connecting terminal, coupled to the port terminal. The electronic tape includes: a second connecting terminal, a first interface, a first central processing unit (CPU), a memory, a digital/analog-converting unit, and a magnetic head. The second connecting terminal is coupled to the first connecting terminal. The first interface is coupled to the second connecting terminal. The first CPU is coupled to the first interface, for decoding the digital voice data. The memory is coupled to the first CPU, for accessing the digital voice data. The digital/analog-converting unit is coupled to the first CPU. The magnetic head is coupled between the digital/analog-converting unit and the voice player. After the digital voice data, stored in the memory, is decoded by the first CPU, the digital/analog-converting unit converts an output from the first CPU. An output from the digital/analog-converting unit is transmitted into the voice player via the magnetic head, and read out by the voice player.

Further, the invention discloses another electronic recording device, for storing a digital voice data encoded by a personal computer (PC) or a web server. The digital voice data is downloaded by PC from the web server. The electronic recording device includes: a radio frequency (RF) base station and an electronic tape for storing the digital voice data. The RF base station includes: a port terminal, a first terminal, a first interface, a first central processing unit, and a first RF transceiver. The first terminal is coupled to PC. The first connecting terminal is coupled to the port terminal. The first interface is coupled to the first connecting terminal. The first CPU is coupled to the first interface. The first RF transceiver is coupled to the first CPU, for transmitting the digital voice data. The electronic tape includes the second connecting terminal, the second interface, the second CPU, the second RF transceiver, a memory, a digital/analog-converting unit and the voice player. The second connecting terminal is coupled to the first connecting terminal. The second interface is coupled to the second connecting terminal. The second CPU is coupled to the second interface, for decoding the digital voice data. The second RF transceiver is coupled to the second CPU, for receiving the digital voice data from the first RF transceiver. The memory is coupled to the second CPU, for accessing the digital voice data. The digital/analog-converting unit is coupled to the second CPU. The magnetic head is coupled between the digital/analog-converting unit and the voice player. After the second CPU decodes the digital voice data, the digital/analog-converting unit converts an output from the second CPU. An output from the digital/analog-converting unit is transmitted to the voice player via the magnetic head and to be read out by the voice player.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1A:
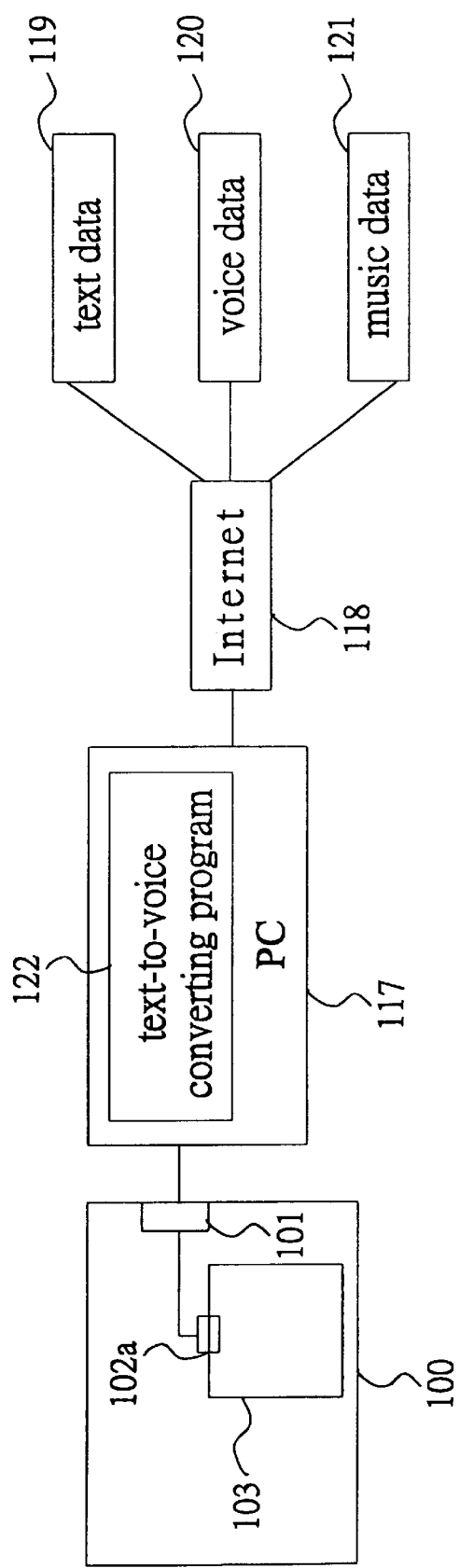
FIGS. 1A and 1B illustrate the block diagram of the electronic recording device of one example of the invention.
Figure 1B:
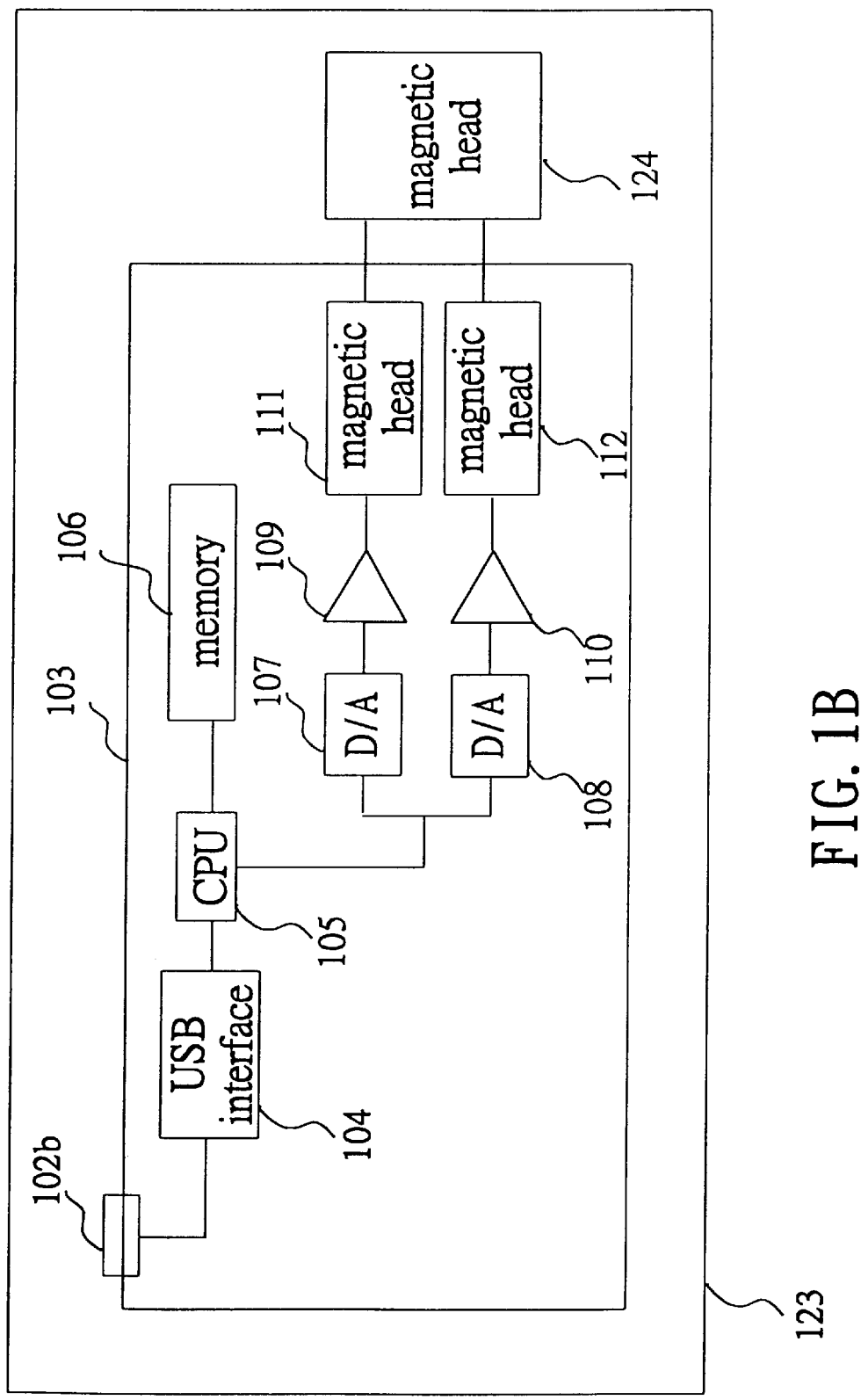

Now referring to FIGS. 1A and 1B, the electronic recording device according to one example of the invention can store digital voice data encoded by a personal computer (PC) 117 or a web server. The digital voice data can be text data 119, voice data 120 and music data 121 in MP3 (MPEG Layer 3) format or the like. In this invention, any processing device capable of encoding and controlling the digital voice data may be applied, for example, a notebook computer.

The text data 119 includes any articles in Internet 118, and the articles may be science articles, news articles and the like. The text data 119 is converted into a voice data by a text-to-voice converting program in PC 117. Via a further processing, the converted text data can be stored in the electronic recording device. The voice data 120 may be news, market analysis, weather forecast, traffic report, audio books and the like. The voice data 120 is compressed by a compression program (not shown) in PC 117 for convenience. In the following specification, the processed text data 119, the processed voice data 120 and the processed music data 121 are generally called as digital voice data.

Now referring to FIG. 1A, the electronic recording device includes a docking station 100 and an electronic tape 103. The docking station 100 includes an universal serial bus (USB) port 101 and a connecting terminal 102a. The USB port 101 connects to a USB port (not shown) of PC 117. The connecting terminal 102a is coupled to the electronic tape 103.

Now refer to FIG. 1B, the electronic tape 103 includes a connecting terminal 102b, an USB interface 104, a central processing unit (CPU) 105, a memory 106, a pair of digital/analog-converters 107/108, a pair of power amplifiers 109/110 and a pair of magnetic heads 111/112.

The docking station 100 is coupled to the electronic tape 103 via the connecting terminals 102a and 102b. The USB port 101 and the connecting terminal 102a form a transmission path of the digital voice data. The transmission path sends the digital voice data from PC 117 via the docking station 100.

The digital voice data from the docking station 100 is transmitted into the CPU 105 via the connecting terminal 102b and the USB interface 104. The CPU 105 is coupled to the USB interface 104.

The memory 106, coupled to the CPU 105, is used for accessing the digital voice data. It is therefore apparent that the digital voice data from PC 117 is stored into the memory 106 through the USB port 101, the connecting terminals 102a/102b, the USB interface 104 and the CPU 105.

As stated above, the digital voice data is encoded (or compressed). When the digital voice data is to be read out from the memory 106, it needs to be decoded (or decompressed). The CPU 105 performs the decoding operation. The decoded digital voice data is received by digital/analog-converters 107/108. The digital/analog-converters 107/108 convert the digital voice data into an analog voice data.

The power amplifiers 109/110 amplify the analog voice data. The amplified analog voice data is then received by magnetic heads 111/112. The magnetic heads contact with an internal magnetic head 124 in a voice player 123. The structures for the magnetic heads 111/112 are similar to that of the magnetic head 124.

Based on the electronic recording device according to one example of the invention, the docking station 100 and the electronic tape 103 are respectively implemented as two individual parts. The docking station 100 includes the USB port 101 and the connecting terminal 102a. The electronic tape 103 includes a connecting terminal 102b and other elements 104–112. In order to be conveniently used, the electronic tape is shaped as the conventional tape. So that, the electronic tape 103 can be placed in the conventional voice player with magnetic heads. The conventional voice player can be, for example, a cassette recorder, a walk-man, etc.

The docking station 100 is fabricated to be able to contain the electronic tape 103 and is coupled to PC 117. When the digital voice data is to be stored in the electronic tape 103, the electronic tape 103 is first placed in the docking station 100. The connection between the docking station 100 and PC 117 is achieved by using connecting terminal 102a of the docking station 100 and connecting terminal 102b of the electronic tape 103. After desirable digital voice data is stored in the electronic tape 103, users can carry the electronic tape 103, and listen to the digital voice data by the walk-man or the cassette recorder in the car.

Figure 2A:
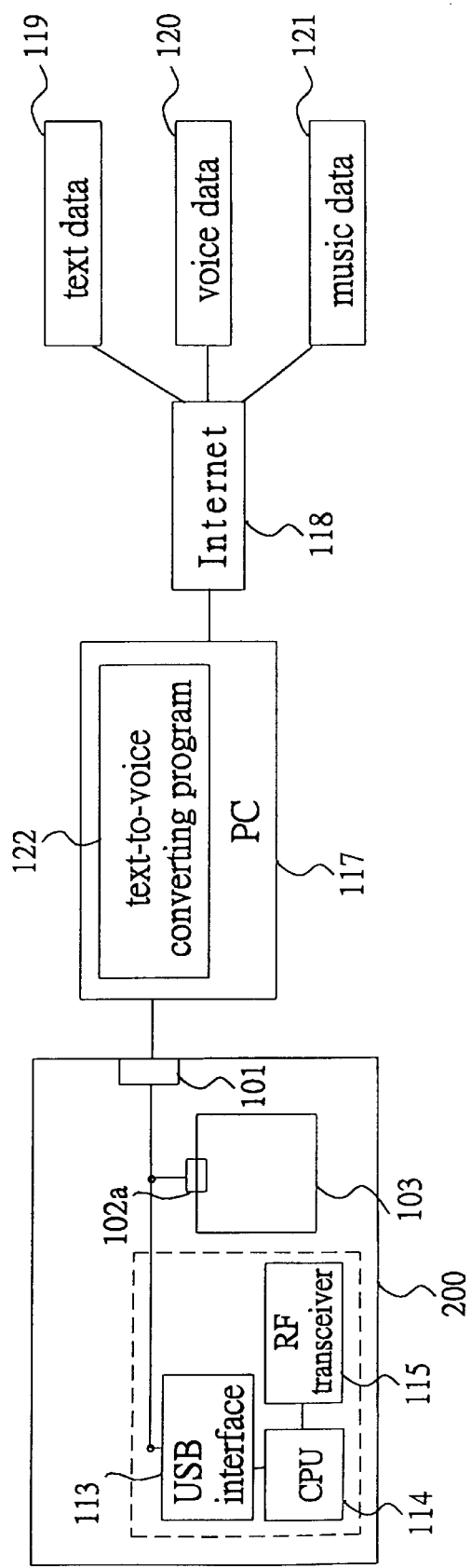
FIGS. 2A and 2B illustrate the block diagram of the electronic recording device of another example of the invention.
Figure 2B:
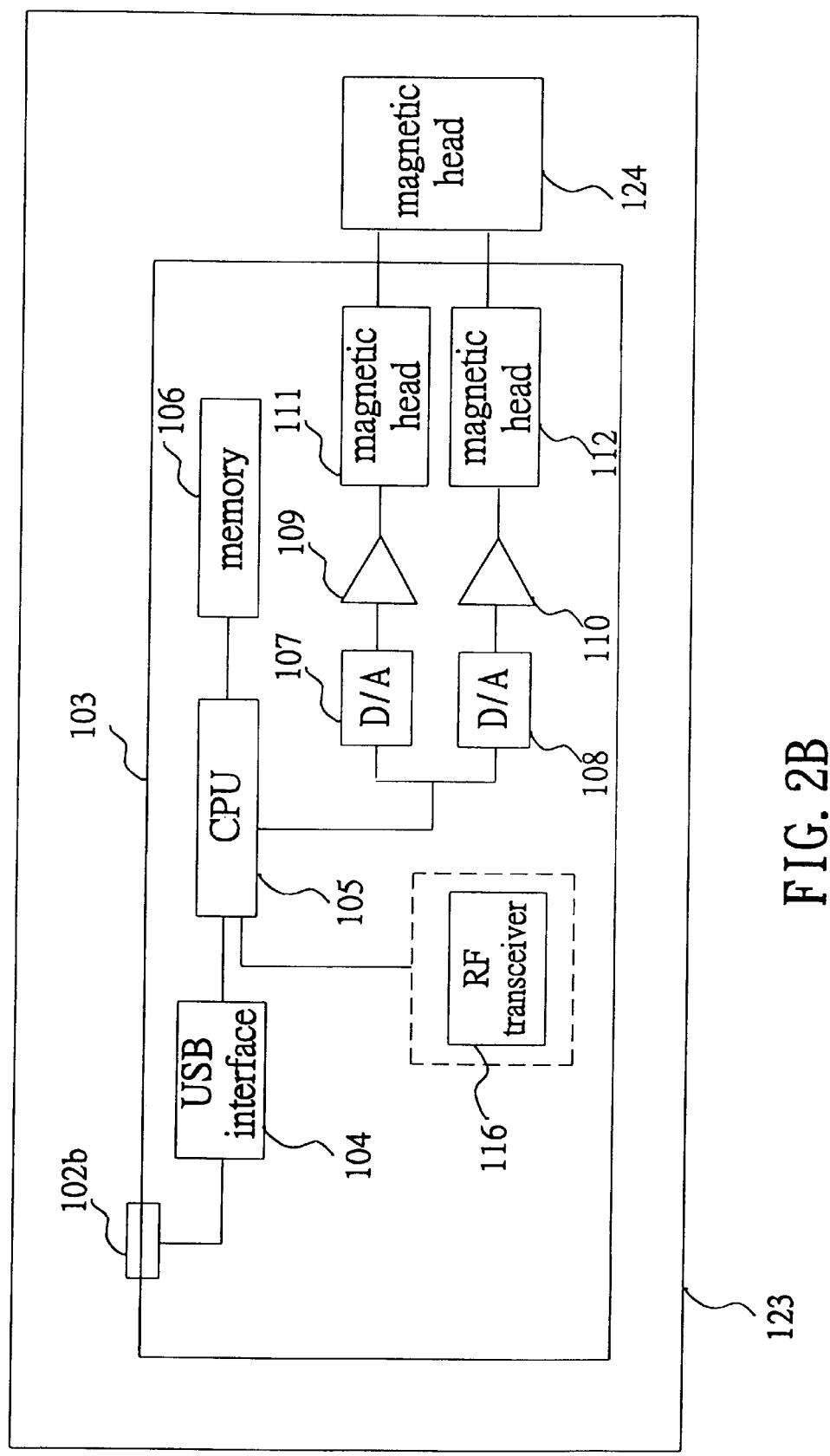

Moreover, the electronic recording device described above can be modified for wireless (or radio frequency, RF) transmitting/receiving. FIGS. 2A and 2B show the block diagram of an electronic recording device with the function of RF transmitting/receiving. The docking station of a wireless electronic recording device is herein referred as a RF base station 200. For a wireless electronic recording device, the electronic tape 103 and the RF base station can be separated for a certain distance during storing data into the electronic tape 103. The existence of obstacle influences the distance between the electronic tape 103 and the RF base station 200. When there is no obstacle, the distance can be as long as about 100 m. Therefore, by the wireless electronic recording device, users can leave the electronic tape 103 at the voice players they often use, for example, a cassette recorder in cars.

For achieving the function of RF transmitting/receiving, the RF base station 200 in FIG. 2A further includes a USB interface 113, a CPU 114 and a RF transceiver 115 and the electronic tape in FIG. 2B further includes a RF transceiver 116. The elements designed especially for RF transmitting/receiving such as the USB interface 113, the CPU 114, the RF transceiver 115 and the RF transceiver 116 are shown as surrounded by dotted lines.

During RF transmitting/receiving, after an executing signal is sent out to the CPU 114 through the USB port 101 and the USB interface 113. The digital voice data is then transmitted to the RF transceiver 115 by the CPU 114. The digital voice data is sent out by RF transceiver 115 as RF wave, and then received by the RF transceiver 116. The digital voice data received by the RF transceiver 116 is then sent to the CPU 105 and stored in the memory 106.

The transmission path for RF transmitting/receiving of the digital voice data includes the USB port 101, the USB interface 113, the CPU 114, the RF transceivers 115/116, and the CPU 105.

The capacity of the memory 106 determines the storing capacity of the electronic recording device according to the invention. A 1-minute long song takes about 1MB of the memory 106 after the song is compressed by the MP3 standard. Besides, the capacity taken by voice data depends on the compression rate. For example, while the compression rate is 4 Kbit/sec (4 Kbit/sec=240 Kbit/min=30 KB/min=1.8 MB/hr), a 1 hour long voice data has about 1.8 MB after compression. However, users determine what will be stored in the memory 106. Users may store MP3 data or/and voice data. The memory 106 is preferably to be a rewrittable memory, such as flash memory. Since 1.8 MB memory can store up to a 1-hour voice data, and the fabrication of a 1.8 MB flash memory is well developed and not expensive so that the application of flash memory is preferable.

By applying the docking station/RF base station and portable electronic tape according to the preferred embodiment of the invention, users may store digital voice data into the electronic tape downloaded from Internet. The digital voice data stored in the electronic tape can be read out in the conventional voice player with magnetic heads. The conventional voice player can be, for example, a cassette recorder, a walk-man and the like. By using the electronic recording device according to the preferred embodiment of the invention, users may contact with needed data in Internet without the limitation of space and device. Besides, with the function of RF transmitting/receiving, the electronic recording device can be utilized more widely.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic recording device, for storing digital voice data encoded by a personal computer (PC) or a web server, wherein the digital voice data is downloaded by the PC from the web server and to be read out by a voice player, the electronic recording device comprising a docking station and an electronic tape, wherein the electronic tape is located in the docking station, and is used for storing the digital voice data;

wherein the docking station; includes
a port terminal, coupled to the PC, and
a first connecting terminal, coupled to the port terminal;

wherein the electronic tape includes
a second connecting terminal, coupled to the first connecting terminal,
a first interface, coupled to the second connecting terminal,
a first central processing unit (CPU), coupled to the first interface, for decoding the digital voice data,
a memory, coupled to the first CPU, for accessing the digital voice data,
a digital/analog-converting unit, coupled to the first CPU, and
a magnetic head, coupled between the digital/analog-converting unit and the voice player; and wherein after the digital voice data is decoded by the first CPU, the digital/analog-converting unit converts an output from the first CPU, and the converted output is transmitted to the voice player via the magnetic head.

2. A device according to claim 1, wherein the port terminal is a USB port terminal.

3. A device according to claim 1, wherein the first interface is a USB interface.

4. A device according to claim 1, wherein the electronic tape further comprises a power amplifier, coupled between the digital/analog-converting unit and the magnetic head.

5. A device according to claim 1, wherein the PC comprises a text-to-voice-converting program for converting text data into the digital voice data.

6. A device according to claim 1, wherein the voice player is a cassette tape recorder.

7. A device according to claim 1, wherein the digital voice data comprises music data in MP3 format.

8. A device according to claim 1, wherein the memory is a flash memory.

9. An electronic recording device, for storing digital voice data encoded by a personal computer (PC) or a web server, wherein the digital voice data is downloaded by the PC from the web server and to be read out by a voice player, the electronic recording device comprising:

a radio frequency (RF) base station and an electronic tape for storing the digital voice data;

wherein the RF base station includes
a port terminal, coupled to the PC;
a first connecting terminal, coupled to the port terminal;
a first interface, coupled to the first connecting terminal;
a first central processing unit (CPU), coupled to the first interface; and
a first RF transceiver, coupled to the first CPU, for transmitting the digital voice data;

wherein the electronic tape includes
a second connecting terminal, coupled to the first connecting terminal;
a second interface, coupled to the second connecting terminal;
a second CPU, coupled to the second interface, for decoding the digital voice data;
a second RF transceiver, coupled to the second CPU, for receiving the digital voice data from the first RF transceiver;
a memory, coupled to the second CPU, for accessing the digital voice data;
a digital/analog-converting unit, coupled to the second CPU; and
a magnetic head, coupled between the digital/analog-converting unit and the voice player;

wherein after the digital voice data is decoded by the second CPU, the digital/analog-converting unit converts an output from the second CPU, and the converted output is transmitted to the voice player via the magnetic head.

10. A device according to claim 9, wherein the port terminal is a USB port terminal.

11. A device according to claim 9, wherein the first interface and the second interface are both USB interfaces.

12. A device according to claim 9, wherein the electronic tape further comprises a power amplifier, coupled between the digital/analog-converting unit and the magnetic head.

13. A device according to claim 9, wherein the PC comprises a text-to-voice-converting program for converting text data into the digital voice data.

14. A device according to claim 9, wherein the voice player is a cassette tape recorder.

15. A device according to claim 9, wherein the digital voice data comprises music data in MP3 format.

16. A device according to claim 9, wherein the memory is a flash memory.

17. An electronic recording device, for storing first digital data encoded by a personal computer (PC) or a web server, wherein the first digital data is downloaded by the PC from the web server, the electronic recording device comprising:

means for receiving the first digital signal, wherein the receiving means includes
a USB port, coupled to the PC, for receiving the first digital signal,
a USB interface, coupled to the USB port, for receiving the first digital signal from the USB port,
a first CPU, coupled to the first USB interface, wherein the USB port, the USB interfaces and the first CPU form a transmission path for the first digital signal,
a first radio-frequency (RF) transceiver, coupled to the first CPU, for receiving the first digital signal from the first CPU and sending the first digital signal as an RF signal, and
a second RF transceiver, receiving the transmitted first digital signal;

means for storing the first digital signal as received by the second RF transceiver;

means for decompressing the stored first digital signal into a second digital signal; and means for converting the second digital signal into an analog signal to be read out in a voice player.

18. A device according to claim 17, wherein the decompressing means comprises:
a second central processing unit (CPU), coupled to the second RF transceiver.

19. A device according to claim 17, wherein the storage means is a flash memory.

20. A device according to claim 17, wherein the converting means is a digital-to-analog converter.

21. A device according to claim 17, further comprising:
a power amplifier, receiving the analog signal; and
a magnetic head, receiving an output from the power amplifier and sending an output to the voice player.

* * * * *